Oct. 3, 1961 K. POSTHUMUS 3,003,031

TELEGRAPH SYSTEM

Filed Feb. 16, 1959

INVENTOR
KLAAS POSTHUMUS
BY Frank R. Jifari
AGENT 3,003,031
TELEGRAPH SYSTEM
Klaas Posthumus, Hilversum, Netherlands, assignor to North American Philips Company, Inc., New York, N.Y., a corporation of Delaware
Filed Feb. 16, 1959, Ser. No. 793,448
Claims priority, application Netherlands Feb. 19, 1958
6 Claims. (Cl. 178—69)

The invention relates to a telegraph receiver for the reception of radio-transmitted signals, characterized by mark and space elements; the transmission of the signals may be performed, for example, by frequency shift or phase shift.

In order to state mutilation of the demodulated signals in the form of mark and space elements of opposite polarities it is known to suppply the demodulated signals to a testing device, which compares the strength of the demodulated signals with a threshold value and which responds, when the strength of the demodulated signals lies below the threshold value. The response of the testing device may be utilized for different purposes, for example, for actuating an alarm system or for the indication of multilated reception of the signals. With a further known telegraph system the response of the testing device is utilized to send a signal back to the transmitter, which then repeats the two or more last-transmitted signals, whilst at the same time, the receiver is rendered inoperative until the rejected signal is received again, so that the rejected signals are automatically corrected.

The invention has for its object to provide a device of the aforesaid kind, in which an improved interference discrimination is obtained by simple means and the number of wrong reproductions of signals is considerably reduced.

In accordance with the invention the demodulated signals are fed to a control-voltage generator to produce a control-voltage varying with the level of the demodulated signals and varying the threshold of the testing device in a sense opposite the said level variations of the demodulated signals.

The invention and its advantages will now be described more fully with reference to the figures.

Figure 1:
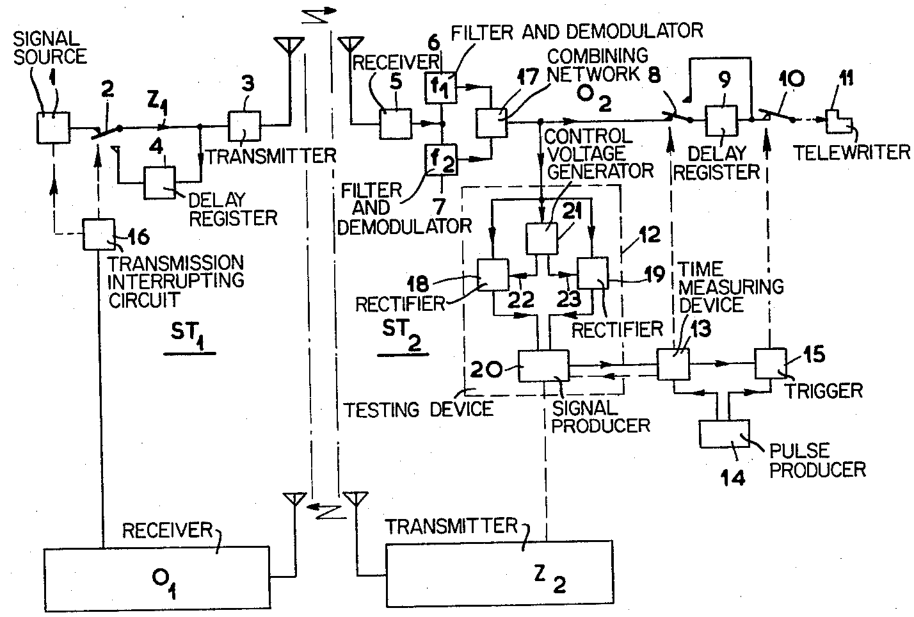
Figure 2:
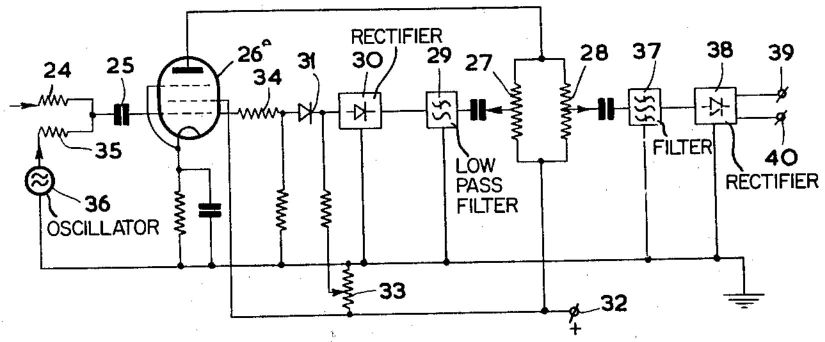

FIG. 1 shows in a block diagram, a telegraph system with automatic signal correction, comprising a telegraph receiver according to the invention and FIG. 2 shows, partly in a detail diagram, a control-voltage generator to be used in a telegraph receiver according to the invention.

The telegraph system shown in FIG. 1 in a block diagram, comprising automatic signal correction and two co-operating stations $ST_1$ and $ST_2$, is suitable for the transmission of radio-transmitted signals characterized by mark- and space-elements. The signals consist in this case of five elements of equal duration in accordance with the normal telegraph code, preceded by a starting element and followed by a stop element the latter elements being utilized to synchronize the receiver with the associated transmitter.

Each of the stations is provided with a transmitter $Z_1$ and $Z_2$ and a receiver $O_1$ and $O_2$ respectively; for the transfer of telegrams from station $ST_1$ to station $ST_2$ the transmitter $Z_1$ co-operates by radio with the receiver $O_2$, whilst, conversely for the communication between station $ST_2$ and station $ST_1$ the transmitter $Z_2$ co-operates with the receiver $O_1$. The signals are supplied in the station $ST_1$ by the signal producer 1 and via the rest contact 2 to the radio transmitter 3, the mark and space elements modulating the transmitter 3 with different sideband frequencies $f_1$ and $f_2$ respectively, which may differ for example by 100 c./s. The transmitter is therefore modulated either with the frequency $f_1$ or with the frequency $f_2$, i.e. not simultaneously with the two frequencies, nor with neither of these frequencies. The radio signals are received in the receiver 5 and supplied to two selective channels 6 and 7, which pass the frequencies $f_1$ and $f_2$ respectively and which are provided each with a demodulator. The signals demodulated in the channels 6 and 7 are combined in anti-phase in a combination network 17 and supplied via a rest contact 8 to the input of a delay register 9, which supplies to the output the signal elements supplied to the input with a time lag equal to the period of a complete signal.

The output voltage of the delay register 9 is supplied via the rest contact 10 to a telewriter 11, which may be arranged at a remote spot.

In order to check the incoming signals the output voltage of the combination network 17 in the receiver $O_2$ is fed to a testing device 12 to be described hereinafter; this device comprises a signal producer 20; if a signal element is disapproved, the testing device 12 responds and the signal producer 20 supplies a signal. In order to prevent the rejected element from co-operating in the formation of an output signal, the signal of the signal producer 20 is fed to a time-measuring device 13, which changes over directly the contact 8 into the operational position, so that the input of the delay register 9 is switched away from the output of the combination network 17 and is connected to the output of the said register, so that the signal elements collected by this register remain circulating in the register until the contact 8 re-occupies the rest position. The pulse producer 14, which is synchronized with the transmitter $Z_1$ in a manner not shown, supplies a pulse to the time-measuring device 13 at every 20 msec. which corresponds to the duration of the signal elements, this device 13 counting the said pulses and switching over the switch 8 into the rest position after 14 pulses, i.e. after a period equal to the duration of two complete signals. At that instant the delay register 9 is exactly in the same position as at the instant when the communication with the channel 6 was interrupted. For this time the testing device 12 is rendered inoperative by the time-measuring device.

The testing device supplies, upon response, also a signal to the transmitter $Z_2$, which in order to indicate that a signal element is received mutilated, may transmit, for example, simultaneously the frequencies corresponding to the mark and space elements. The testing device in the receiver $O_1$ thus reacts and supplies a signal to the device 16 of the transmitter $Z_1$, which interrupts the transmission of signals from the signal producer 1 to the transmitter $Z_1$ and changes over the contact 2 into the operational position for a time equal to the duration of two complete signals, i.e. for 14 elements. With the transmission of signals from $ST_1$ to $ST_2$ the signal producer 1 supplies the signals via the rest contact 2 not only to the radio transmitter 3, but also the input of the delay register 4, of which the time lag is equal to the duration of two complete signals. At the instant when the contact 2 is changed over, the delay register 4 has registered the signal elements last emitted, which are then caused by the register to be repeated and to be received in the receiver $O_2$ just 14 elements after the first time. At the instant when the contact 8 returns into the rest position just the signal element rejected by the testing device 12 will be received again and be transferred to the delay register 9, at least if it is then received non-mutilated, so that the signal elements always have the correct order of succession in the delay register 9. The recorded elements are therefore all correct.

In the receiver $O_2$ provisions are made that the elements of the same signal are supplied in direct order of succession to the telewriter 11, i.e. if a disturbed signal element is received and if the supply of new elements to the delay register 9 is interrupted at an instant when the delay register transfers a signal element to the telewriter 11, this signal is transferred still completely. To this and the pulse generator 14 emits periodically every 140 msec. a pulse to the trigger 15, which controls the switch 10, these pulses coinciding always with the instants when the transfer of a signal from the delay register 9 to the telewriter 11 is just terminated. The trigger 15 is furthermore controlled by the time-measuring device 13 so that it, upon reception of one of the said pulses occuring every 140 msec., changes over into the position in which contact 10 is open, when the time-measuring device 13 counts a repetition period and into the position in which contact 10 is closed at the reception of such pulses when at the instant concerned the time-measuring device 13 is in the rest position, i.e. when rest contact 8 is closed. When the testing device 12 responds, the contact 8 will therefore be directly changed over, but the contact 10 will be opened after the transfer of a signal to the telewriter 11 has completely terminated, whereas the contact 10 is closed again at the instant when the next-following signal can be transferred to the telewriter 11.

In order to ensure a reliable judgment of the incoming signal elements the strength of the mark and space elements of opposite polarities obtained from the combination network 17 is compared in the testing device with a threshold value. The testing device may comprise to this end two rectifying cells 18 and 19, passing current in opposite senses and biased by voltages of $+p$ and $-p$ v.

According as the signal elements exceed the threshold voltage of $+p$ or $-p$ v. or remain below this threshold voltage, the incoming signal elements are approved or disapproved. In the latter case a signal produced by the signal producer 20 is supplied to the time-measuring device 13 and the transmitter $Z_2$; as stated above the input of the delay register 9 is switched away from the output of the combination network 17 and the transmitter $Z_2$ emits a signal to the receiver $O_1$ in order to initiate a repetition of the emitter signal elements.

In accordance with the invention a material improvement is obtained in the interference discrimination by supplying the mark and space elements of opposite polarities, derived from the combination network 17, a control-voltage generator 21 in order to produce a control-voltage which varies with the level of the demodulated signals and varies the threshold value of the testing device in a sense opposite the level variations of the demodulated signal elements. In the embodiment shown a push-pull rectifier 21 is provided to this end; voltages of opposite polarities derived from the output conductors 22, 23 are supplied to the rectifying cells 18, 19 where they are combined with the bias voltage of $+p$ or $-p$ v. of the rectifying cells 18, 19 already prevailing so that a high bias voltage occurs at a low strength of the demodulated signal elements and a low bias voltage in the case of a high strength of the demodulated signal elements.

The improvement in the interference discrimination obtained by using the measure described above will now be described more fully.

At the instants of a strong fading effect it may occur that simultaneously with a signal element received via one of the frequency channels 6, 7, this element having therefore a low strength, an instantaneous strong noise signal occurs in the other frequency channel, this noise signal thus producing a direct voltage of a polarity opposite that of the incoming signal element so that at the combination network 17 occurs a voltage which corresponds to the complementary signal element. Thus owing to the simultaneous occurrence of fading and an instantaneous strong noise such an interference may be produced that at the transfer of a mark element to the combination network 17 a voltage corresponding to a space element occurs, whereas at the transfer of a space element a voltage corresponding to a mark element may occur.

The possibility that such a voltage at the combination network 17 should be approved by the testing device 12, since this voltage exceeds the bias voltage concerned of the rectifiers 18, 19 and would thus lead in the telewriter 11 to an erroneous reproduction of the transmitted signal, is reduced materially in the system according to the invention, since at the said instants the threshold value of the testing device 18, 19 is high.

Conversely if the signal elements are received with a high signal strength, the threshold value of the testing device will be low. An erroneous reproduction of the signal elements is not likely to occur and the low threshold value provides, moreover the advantage that there will be no unnecessary disapproval of signal elements, so that undesired loss of time due to unnecessary repetition of signal elements is avoided.

By using the said method in which the threshold value varies opposite the level of the signals derived from the combination network 17, an effective interference discrimination is obtained, so that apart from a more efficient use of the telegraph system described a material reduction of the number of signal elements erroneously reproduced in the telewriter 11 is obtained. The number of erroneously reproduced signal elements, this number amounting in the known devices to a few percent was reduced by a factor 10 or more without undesired prolongation of the time required for the transfer of a telegram due to undesired repetitions.

It can be fixed statistically and mathematically that between the threshold value and the level of the incoming signal elements there is a simple relationship for obtaining optimum conditions; the threshold value should vary substantially inversely proportionally to the level of the signal elements. If the bias voltage operating at a threshold value is designated by $+q$ and $-q$ v. this relationship is given in a mathematical form by the formula:

$$q=C/A \qquad \text{(I)}$$

wherein C designates a constant which can be fixed mathematically or experimentally and A is the level of the signal elements.

FIG. 2 shows, partly in a detail diagram, a control-voltage generator which is capable of producing a threshold value which is accurately inversely proportional to the level of the signal elements.

In this control-voltage generator the signals obtained from the combination network 17 are supplied via a series resistor 24 and a grid capacitor 25 to the control-grid of a pentode 26, which includes in its anode circuit two parallel-connected reisistors 27 and 28. To a tapping of the resistor 27 is connected a low-pass filter 29, which allows the signal elements to pass and which is followed by a rectifier 30, across the output circuit of which occurs, by rectification of the signal elements, a direct voltage varying with the level of the signal elements and having negative polarity. The direct output voltage of the rectifier 30 of negative polarity is supplied via a rectifying cell 31, comprising a bias voltage obtained from a potentiometer 33 between the positive voltage terminal 32 and earth, and a series resistor 34, to the control-grid of the pentode 26 for mutual-conductance control. Owing to the mutual-conductance control the level of the signal elements obtained from the output of the pentode 26 will be substantially constant, so that the steepness of the pentode 26 varies substantially inversely proportionally to the level of the signal elements supplied to the input.

To the control-grid of the pentode 26 is, moreover, connected, via a series-resistor 35, an auxiliary oscillator 36, which provides an auxiliary alternating voltage of constant amplitude, whilst a tapping of the anode resistor 28 is connected via a selective filter 37, tuned to the oscillator frequency, to a push-pull rectifier 38, from the output terminals 39 and 40 of which is obtained a positive and a negative direct voltage respectively, which varies accurately inversely proportionally to the level of the signal elements, since it is ensured by the mutual-conductance control described that the auxiliary alternating voltage from the auxiliary oscillator 36, of constant amplitude, is amplified in the amplifying stage 26 inversely proportionally to the level of the signal elements.

Instead of using rectifying cells for the testing device other elements may be employed for example tubes or transistors.

It should finally be noted that the method according to the invention may be used advantageously in a telegraph system in which a plurality of separate receivers are employed (diversity reception). With respect to the signal interference level it is advantageous in this case to join first the signal from the various channels in a combination network and to supply these joined signals subsequently to the delay register and the testing device.

What is claimed is:

1. Means for providing an output signal responsive to mutilation of telegraph signals having mark and space elements of opposite polarity, comprising a source of threshold voltages, means for comparing said signals with said threshold voltages to provide said output signal when said signals have amplitudes less than said threshold voltages, means for providing a control voltage having an amplitude dependent upon the amplitude of said mark and space signals, and means for applying said control voltage to said threshold voltage source to vary the amplitude of said threshold voltages oppositely with respect to variations of the ampltiude of said mark and space signals.

2. Means for providing an output signal responsive to mutilation of telegraph signals of the type having mark and space elements comprising means for demodulating said signals to provide demodulated mark and space element signals of opposite polarity, a source of threshold voltages, means for comparing said demodulated signals with said threshold voltages to provide said output signal when said demodulated signals have amplitudes less than said threshold voltages, means for providing a control voltage having an amplitude dependent upon the amplitude of said demodulated signals, and means for applying said control voltage to said source to vary the amplitude of said threshold voltages inversely of the amplitude of said demodulated signals.

3. Means for providing an output signal responsive to mutilation of telegraph signals of the type having mark and space elements comprising means for demodulating said signals to provide demodulated mark and space element signals of opposite polarity, an amplifying device having input and output electrodes, means for applying said demodulated signals to said input electrode, rectifier means connected to said output electrode, means for applying the rectified output of said rectifier means to said amplifier device to vary the transconductance thereof inversely in response to variations of said demodulated signal, a source of oscillations, means for applying said oscillations to said input electrode, a filter selective to the frequency of said oscillations, means for connecting said filter to said output electrode, a push-pull rectifier connected to the output of said filter to provide threshold voltages, and means for comparing said threshold voltages with said demodulated signals.

4. The means of claim 3, in which said amplifying device comprises an electron discharge tube having a cathode, a control grid, and an anode, comprising means for applying said demodulated signals, rectified output, and oscillations between said control grid and cathode.

5. A telegraph receiver for the reception of signals having mark and space elements comprising means for demodulating said signals to provide demodulated mark and space element signals of opposite polarity, a source of mark and space threshold voltages, means for comparing the amplitude of said demodulated signals with said threshold voltages to provide an output signal when the amplitude of said demodulated mark and space element signals is less than said mark and space threshold voltages, a control voltage generator, means for applying said demodulated signals to said control voltage generator to provide a control voltage having an amplitude dependent upon the amplitude of said demodulaed signals, and means for applying said control voltage to said threshold voltage source to vary said threshold voltages inversely with respect to variations of the amplitude of said demodulated signals.

6. In a telegraph system for the transfer of signals each of which consists of a constant number of elements of the same duration, a transmitter, a receiver comprising means for receiving said signals, means for demodulating said signals to provide mark and space signals of opposite polarity, a delay register having a time lag equal to a whole multiple of the period of the telegraph signals, means for applying said opposite polarity signals to said register, an output circuit connected to said register, a source of threshold voltages, means for comparing said opposite polarity sginals with said threshold voltages to provide an output signal when said opposite polarity signals have an amplitude less than said threshold voltages, means for varying the amplitude of said threshold voltages inversely of variations in amplitude of said opposite polarity signals, means for interrupting the supply of said opposite polarity signals to said delay register in response to said output signals, means for connecting the output of said delay register to the input thereof for a time equal to the delay time thereof, and means for transmitting said output signals to said transmitter, said transmitter comprising means for repeating a predetermined number of signal elements equal to a whole multiple of the number of elements in a signal.

References Cited in the file of this patent

UNITED STATES PATENTS

| | | |
|---|---|---|
| 2,581,961 | Lake | Jan. 8, 1952 |
| 2,587,561 | Wilder | Feb. 26, 1952 |
| 2,597,071 | Cory | May 20, 1952 |
| 2,668,192 | Cory | Feb. 2, 1954 |
| 2,868,875 | Di Santi | Jan. 13, 1959 |